United States Patent [19]
Dillinger

[11] 3,816,933
[45] June 18, 1974

[54] PRECISION HOLE SPOTTING TOOL

[76] Inventor: Roy R. Dillinger, 305 McElhaney Ave., South Connellsville, Pa. 15425

[22] Filed: Nov. 3, 1972

[21] Appl. No.: 303,358

[52] U.S. Cl. .................................................. 33/189
[51] Int. Cl. ............................................ G01b 5/02
[58] Field of Search ..... 33/189, 191, 197, 96, 143 J

[56] References Cited
UNITED STATES PATENTS

| | | | |
|---|---|---|---|
| 1,135,089 | 4/1915 | Wilks | 33/189 |
| 2,203,992 | 6/1940 | Lutz | 33/189 |
| 2,830,378 | 4/1958 | Givan | 33/189 |
| 3,173,214 | 3/1965 | Daller | 33/189 |
| 3,381,387 | 5/1968 | Landrum | 33/189 |
| 3,505,741 | 4/1970 | Meyer | 33/143 J |

Primary Examiner—Louis R. Prince
Assistant Examiner—Willis Little
Attorney, Agent, or Firm—Victor J. Evans & Co.

[57] ABSTRACT

A precision hole spotting tool having a pair of scales arranged perpendicularly to each other with one of the scales being slidable with respect to a body and the other scale being fixed with respect to the body. The slidable scale carries a center punch for marking the location of a hole to be drilled. The second scale has a slide mounted thereon and arranged to contact the side of the work. A clamp is provided with each scale for clamping the scale in adjusted position with respect to the slide and to the body and a vernier is provided for use with the scale to increase the accuracy of the settings.

1 Claim, 3 Drawing Figures

PATENTED JUN 18 1974  3,816,933

PRECISION HOLE SPOTTING TOOL

BACKGROUND OF THE INVENTION

1. Field of the Invention

The present invention relates to precision hole spotting tools for marking the exact position for the center of a hole in a generally rectangular work piece.

2. Summary of the Invention

A precision hole spotting tool including a body adapted to engage the flat side of the work piece and having a sliding scale mounted therein carrying a center punch at its inner end. The body has an offset portion with a fixed scale secured thereto extending perpendicularly to the sliding scale in the body. A slide carrying a work engaging piece is mounted for sliding movement on the fixed scale and has a vernier thereon for accurate setting.

The primary object of the invention is to provide a precision hole spotting tool in which the exact position of the hole center can be marked with a center punch based upon accurate measurements from the flat sides of a generally rectangular work piece.

Other objects and advantages will become apparent in the following specification when considered in the light of the attached drawings.

DESCRIPTION OF THE PREFERRED EMBODIMENT

Figure 1:
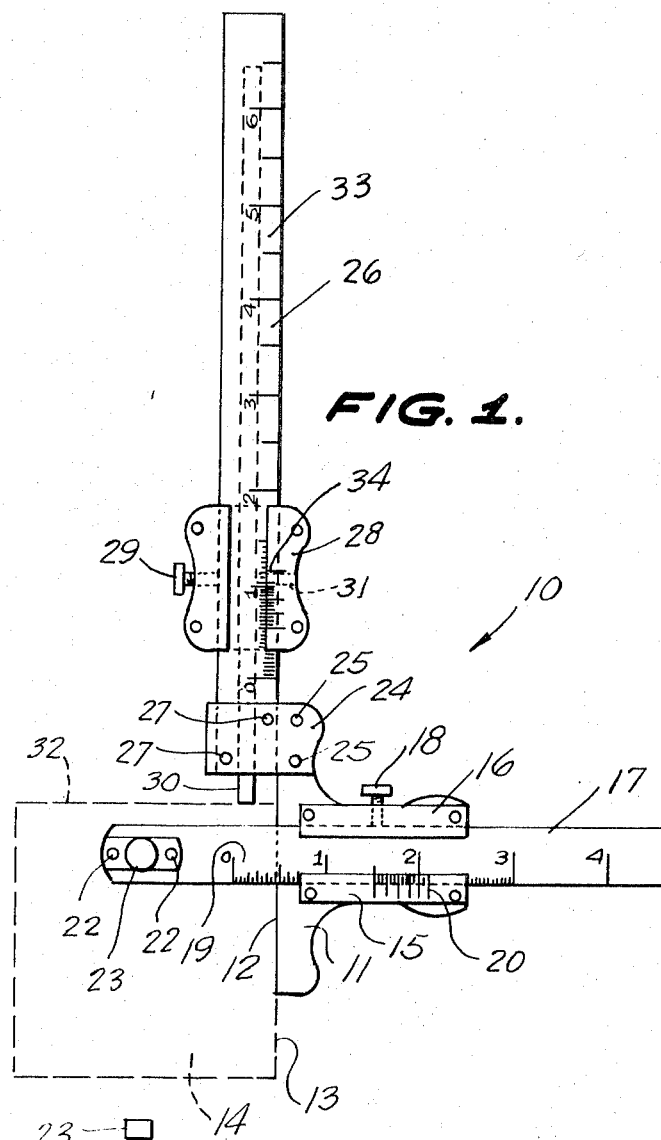
FIG. 1 is a top plan view of the invention.
Figure 2:
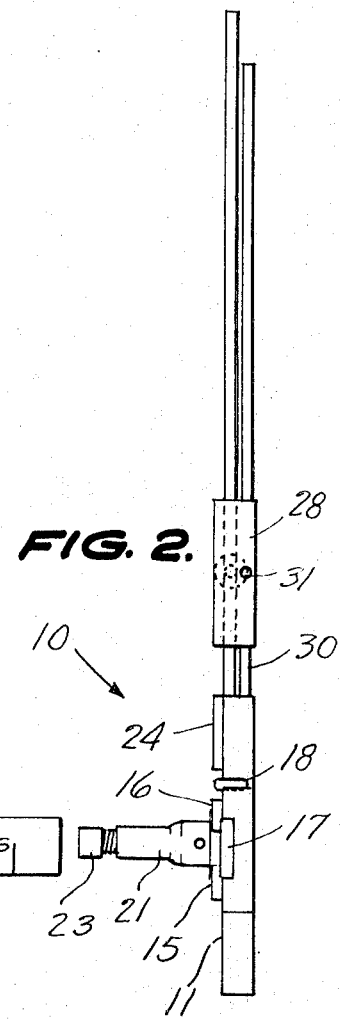
FIG. 2 is a side elevation of the invention.
Figure 3:
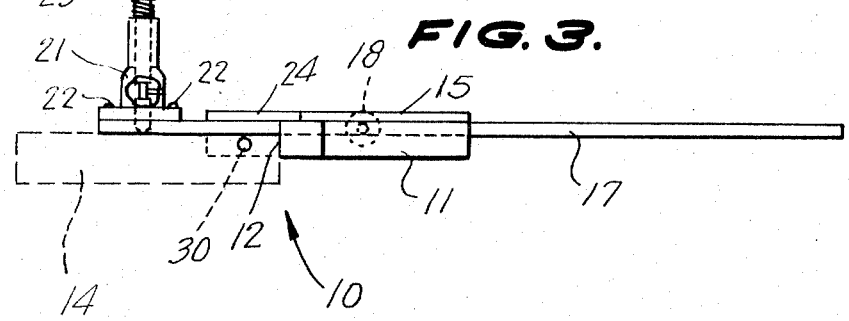
FIG. 3 is an end elevation of the invention.

Referring now to the drawings in detail, wherein like reference characters indicate like parts throughout the several figures, the reference numeral 10 indicates generally a precision hole spotting tool constructed in accordance with the invention.

The hole spotting tool 10 includes a body 11 having straight edge 12 formed thereon for engaging a flat side 13 of a work piece 14. The body 11 has a pair of spaced parallel guides 15, 16 secured thereto to hold a generally rectangular scale 17 mounted for sliding movement across the body 11 within the guides 15, 16. A thumb screw 18 is threaded through the side of the body 11 and is adapted to engage the side edge of the scale 17 in order to clamp the scale 17 in adjusted position.

The scale 17 has indicia markings 19 therealong and are adapted to cooperate with a vernier 20 on the guide 15 to permit extremely accurate settings of the scale 17 with respect to the body 11.

A guide body 21 is secured to the inner end of the scale 17 by a pair of rivets 22. A vertical center punch 23 is slidably mounted in the guide body 21 and is adapted to engage the work 14 on the underside of the scale 17 and can be tapped lightly to mark the center of the hole to be formed in the work piece 14.

An offset arm 24 is secured to the body 11 by rivets 25 and is spaced above the scale 17 so as to be able to slide over the work piece 14 without contact therewith. A generally rectangular scale 26 is secured to the arm 24 by rivets 27 with the scale 26 on the underside of the arm 24 but spaced sufficiently above the housing 11 so that the scale 26 can readily move across the face of a work piece 14 in the operation of the device.

A slider 28 is mounted on the scale 26 for sliding action thereon and has a thumb screw 29 threaded therethrough for engagement with the scale 26 to lock the slider 28 in adjusted position on the scale 26. A work contact finger 30 is mounted in the slider 28 and is secured therein by a set screw 31. The work contact piece 30 engages the side 32 of the work piece 14 as can be seen in FIG. 1. The scale 26 has scale indicia 33 printed thereon and adapted to cooperate with a vernier 34 on the slider 28 to accurately set the slider 28 with the scale 26.

In the use and operation of the invention after the correct distance for the hole to be drilled is determined as related to the side 12 and the side 32 of the work piece the scale 17 is first set to reflect the accurate distance from the side 12 to the center of the hole to be drilled. After setting the scale 17 the thumb screw 18 is tightened to clamp the body 11 to the scale 17. The slider 28 is then positioned on the scale 26 at a position to reflect the distance from the side 32 of the work piece 14 to the center of the hole to be drilled. The thumb screw 29 is then tightened to clamp the slider 28 on the scale 26 and the body 11 is engaged with the side 12 of the work piece 14 and the finger 30 is engaged with the side 32 thereof accurately positioning the center punch 23 over the center of the hole to be drilled. The center punch 23 is then lightly tapped to mark the center to be drilled.

Having thus described the preferred embodiment of the invention it should be understood that numerous structural modifications and adaptations may be resorted to without departing from the spirit of the invention.

What is claimed is:

1. A precision hole spotting tool for marking a center on a workpiece, comprising a body having a straight edge for engagement with an edge of said workpiece, an offset arm integrally formed on said body and extending perpendicularly to said straight edge on said body, a scale bar arranged perpendicularly to the straight edge on said body for longitudinal sliding movement thereon, a guide body secured to the inner end of the scale bar, a center punch slidably mounted in the guide body for engaging a workpiece, a pair of spaced apart flat guide plates rigidly secured to said body partially overlying said scale bar to retain said scale bar in place, a thumb screw threaded through said body into one side of said body to releasably clamp said scale bar in said body against sliding movement therein, a vernier scale delineated on at least one of said guide plates for cooperation with a scale on said scale bar, an elongate scale bar having one end rigidly secured to said offset arm and extending in a direction parallel to said straight edge a slider mounted for movement longitudinally along said last named scale bar, a thumb screw in said slider for engagement with said last named scale bar for releasably clamping said slider in adjusted position on said last named scale bar, an elongate work engaging finger secured to said slider and extending along said last-mentioned scale bar for engaging an edge of said work piece perpendicularly to the edge thereof engaged by said straight edge, said finger moving along its own axis as said slider is adjusted on said last named scale bar, and a vernier scale on said slider for cooperation with a scale on said last named scale bar to accurately position said finger with respect to said body.

* * * * *